(12) United States Patent
Studyvin et al.

(10) Patent No.: US 7,825,629 B2
(45) Date of Patent: Nov. 2, 2010

(54) METHOD AND SYSTEM FOR CELL EQUALIZATION WITH CHARGING SOURCES AND SHUNT REGULATORS

(75) Inventors: William B. Studyvin, Cherokee, KS (US); Eric Coatney, Bronaugh, MO (US); Tim Pennock, Webb City, MO (US); Phillip Shimp, Diamond, MO (US); Greg Miller, Diamond, MO (US)

(73) Assignee: EaglePicher Technologies, Joplin, MO (US)

( * ) Notice: Subject to any disclaimer, the term of this patent is extended or adjusted under 35 U.S.C. 154(b) by 0 days.

(21) Appl. No.: 12/497,372

(22) Filed: Jul. 2, 2009

(65) Prior Publication Data

US 2009/0267565 A1 Oct. 29, 2009

Related U.S. Application Data

(63) Continuation of application No. 11/163,667, filed on Oct. 26, 2005, now abandoned.

(60) Provisional application No. 60/522,814, filed on Nov. 10, 2004.

(51) Int. Cl.
 *H02J 7/00* (2006.01)
(52) U.S. Cl. .................. 320/122; 320/116; 320/119
(58) Field of Classification Search .............. 320/118
 See application file for complete search history.

(56) References Cited

U.S. PATENT DOCUMENTS

| | | |
|---|---|---|
| 4,238,721 A | 12/1980 | Deluca et al. |
| 4,467,266 A | 8/1984 | Ritchie |
| 5,498,950 A | 3/1996 | Ouwerkerk |
| 5,504,415 A | 4/1996 | Podrazhansky et al. |
| 5,592,067 A | 1/1997 | Peter et al. |
| 5,631,534 A | 5/1997 | Lewis |
| 5,656,915 A | 8/1997 | Eaves |
| 5,659,208 A | 8/1997 | Kimble et al. |
| 5,710,504 A | 1/1998 | Pascual et al. |
| 5,811,959 A | 9/1998 | Kejha |
| 5,821,733 A | 10/1998 | Turnbull |
| 5,850,136 A | 12/1998 | Kaneko |
| 5,867,007 A | 2/1999 | Kim |

(Continued)

FOREIGN PATENT DOCUMENTS

JP 08237861 9/1996

OTHER PUBLICATIONS

Non-final Office Action mailed from the USPTO in U.S. Appl. No. 11/163,668, Feb. 21, 2008, 12 pgs.

(Continued)

*Primary Examiner*—Edward Tso
*Assistant Examiner*—Ramy Ramadan
(74) *Attorney, Agent, or Firm*—Armstrong Teasdale LLP

(57) ABSTRACT

A system and method for charging a rechargeable, or secondary, battery including a series string of cells, includes a topology of charging sources that selectively provides charging current to cells that need to be charged, but avoids overcharging cells that are already charged above a predetermined voltage threshold. Based on individual cell voltage measurements, the charging current is controlled in a manner to direct charging current to the battery cell(s) needing charge until these cells are fully charged, and by-passes battery cells that are fully charged or become fully charged.

13 Claims, 5 Drawing Sheets

U.S. PATENT DOCUMENTS

| | | |
|---|---|---|
| 5,920,179 A | 7/1999 | Pedicini |
| 5,945,804 A | 8/1999 | Hansson et al. |
| 5,952,815 A | 9/1999 | Rouillard et al. |
| 5,965,996 A | 10/1999 | Arledge et al. |
| 6,064,178 A | 5/2000 | Miller |
| 6,094,031 A | 7/2000 | Shimane et al. |
| 6,097,174 A | 8/2000 | Yang et al. |
| 6,140,800 A | 10/2000 | Peterson |
| 6,150,795 A | 11/2000 | Kutkut et al. |
| 6,157,167 A | 12/2000 | Schwartz et al. |
| 6,181,106 B1 | 1/2001 | Finger |
| 6,222,344 B1 | 4/2001 | Peterson et al. |
| 6,268,710 B1 | 7/2001 | Koga |
| 6,316,917 B1 | 11/2001 | Ohta |
| 6,326,768 B2 | 12/2001 | Nagai et al. |
| 6,377,024 B1 | 4/2002 | Choy |
| 6,388,424 B1 | 5/2002 | Hidaka et al. |
| 6,441,583 B1 | 8/2002 | Perelle |
| 6,452,363 B1 | 9/2002 | Jabaji |
| 6,580,249 B2 | 6/2003 | Yau et al. |
| 6,580,251 B2 | 6/2003 | Takeuchi |
| 6,586,917 B1 | 7/2003 | Smith |
| 6,608,470 B1 | 8/2003 | Oglesbee et al. |
| 6,703,722 B2 | 3/2004 | Christensen |
| 6,791,297 B2 | 9/2004 | Ott et al. |
| 6,822,423 B2 | 11/2004 | Yau et al. |
| 6,841,971 B1 | 1/2005 | Spee et al. |
| 6,983,212 B2 | 1/2006 | Burns |
| 7,061,207 B2 | 6/2006 | Patel et al. |
| 2002/0047685 A1 | 4/2002 | Perelle |
| 2002/0084770 A1 | 7/2002 | Jabaji |
| 2002/0195994 A1 | 12/2002 | Perelle |
| 2003/0042870 A1 | 3/2003 | Yau et al. |
| 2003/0113600 A1 | 6/2003 | Wardrop et al. |
| 2003/0139888 A1 | 7/2003 | Burns |
| 2003/0160593 A1 | 8/2003 | Yau et al. |
| 2003/0218446 A1 | 11/2003 | Beerwerth et al. |
| 2004/0012371 A1 | 1/2004 | Ott et al. |
| 2004/0135544 A1 | 7/2004 | King et al. |
| 2004/0145346 A1 | 7/2004 | Hall et al. |
| 2004/0164706 A1 | 8/2004 | Osborne |
| 2006/0097696 A1 | 5/2006 | Studyvin |
| 2006/0097697 A1 | 5/2006 | Studyvin |
| 2006/0097700 A1 | 5/2006 | Studyvin et al. |
| 2007/0063670 A1 | 3/2007 | Taurand |

OTHER PUBLICATIONS

Non-final Office Action mailed from the USPTO in U.S. Appl. No. 11/163,668, Jun. 26, 2007, 11 pgs.

Non-final Office Action mailed from the USPTO in U.S. Appl. No. 11/163,669, Jul. 28, 2008, 12 pgs.

Final Office Action mailed from the USPTO in U.S. Appl. No. 11/163,669, Feb. 6, 2008, 21 pgs.

Non-final Office Action mailed from the USPTO in U.S. Appl. No. 11/163,669, Aug. 16, 2007, 17 pgs.

Control Truth Table

| 1 | 2 | 3 | 4 | 5 | 6 | 7 | 8 | 9 | 10 | 11 | 12 |
|---|---|---|---|---|---|---|---|---|---|---|---|
| Permutations | Battery Cell 320 | Battery Cell 325 | Battery Cell 330 | Battery Cell 335 | Current Source 305 | Current Source 310 | Current Source 315 | Shunt Regulator 350 | Shunt Regulator 355 | Shunt Regulator 360 | Charging Operation |
| 1. | low | low | low | low | On | Off | Off | Off | Off | Off | All battery cells charging |
| 2. | low | low | low | high | On | Off | Off | Off | Off | On | Battery cells 320, 325, 330 charging |
| 3. | low | low | high | low | On | Off | Off | Off | On | Off | Battery cells 320, 325, 335 charging |
| 4. | low | low | high | high | On | Off | Off | Off | On | On | Battery cells 320, 325 charging |
| 5. | low | high | low | low | On | Off | Off | On | Off | Off | Battery cells 320, 330, 335 charging |
| 6. | low | high | low | high | On | Off | Off | On | Off | On | Battery cells 320, 330 charging |
| 7. | low | high | high | low | On | Off | Off | On | On | Off | Battery cells 320, 335 charging |
| 8. | low | high | high | high | Off | Off | Off | On | On | On | Battery cell 320 charging |
| 9. | high | low | low | low | Off | On | Off | Off | Off | Off | Battery cells 325, 330, 335 charging |
| 10. | high | low | low | high | Off | On | Off | Off | Off | On | Battery cells 325, 330 charging |
| 11. | high | low | high | low | Off | On | Off | Off | On | Off | Battery cells 320, 335 charging |
| 12. | high | low | high | high | Off | On | Off | Off | On | On | Battery cell 325 charging |
| 13. | high | high | low | low | Off | Off | On | On | Off | Off | Battery cells 330, 335 charging |
| 14. | high | high | low | high | Off | Off | On | On | Off | On | Battery cell 330 charging |
| 15. | high | high | high | low | Off | Off | On | On | On | Off | Battery cell 335 charging |
| 16. | high | high | high | high | Off | Off | Off | Off | Off | Off | No battery cells charging |

FIG. 4

METHOD AND SYSTEM FOR CELL
EQUALIZATION WITH CHARGING
SOURCES AND SHUNT REGULATORS

CROSS REFERENCE TO RELATED
APPLICATIONS

This application is a continuation application of U.S. application Ser. No. 11/163,667, filed Oct. 26, 2005, which claims priority to U.S. Provisional Application No. 60/522,814, filed Nov. 11, 2004, both of which are hereby incorporated by reference in their entirety.

FIELD OF THE INVENTION

The invention generally relates to secondary (rechargeable) batteries, and more particularly, to cell equalization of such batteries.

BACKGROUND OF THE INVENTION

Generally, secondary (rechargeable) batteries include a string of individual battery cells connected in series to obtain a higher output voltage level. During charging of secondary batteries, inherent differences in the capacity of the individual battery cells may cause the higher capacity cells to achieve full charge first, and then over-charge while the remaining battery cells continue to charge. Depending on the ability of the cell chemistry to tolerate this over-charge, cell damage may occur. During discharge, a similar problem may be encountered when the lower capacity battery cells reach minimum voltages first and over-discharge. Cell chemistries such as lead-acid and nickel-cadmium may tolerate moderate forms of these conditions, while other cell chemistries, such as silver-zinc and lithium-ion, may be more easily damaged. The probability of damage due to over-charge may be further aggravated by demand for rapid charging systems that require higher currents and cell temperatures.

For the reasons stated above, charging a series-connected string of individual battery cells normally poses unique monitoring and control difficulties. For example, measuring the voltage of the battery may not necessarily indicate the condition of each individual cell in the battery. If the individual battery cells are, for example, not well balanced, a cell may experience a damaging over-charge condition even though the battery voltage is within acceptable limits. Thus, each battery cell in a string usually is monitored and controlled to insure that each individual cell in the series string does not experience an over-voltage condition during charging.

When charging, secondary battery cells generally are bulk charged if the cell voltage is above a specified level. Bulk charging continues until any individual cell voltage reaches an upper voltage limit. At the end of bulk charging, one or more battery cells may, however, be only partially charged, and may not have yet reached a 100% state of charge. The partially charged condition is considered adequate for some applications and, thus, the charging process may be terminated prior to each individual cell being 100% charged. Over time, however, the performance of individual cells in the battery may diverge due to each cell being charged to a different level during any one recharge. To minimize divergence, a second step in the charging process often is implemented.

The second step in the charging process is known as "cell equalization." Cell equalization generally begins when a battery cell is clamped at an upper voltage limit during charging. The charging current usually decreases because the cell voltage is clamped, and not allowed to increase. To protect against cell failure, safeguards to terminate the charging process prior to cell failure often are employed. Cell charging may be terminated (and cell equalization ended) based on a specified cell charge current level (normal condition), a specified over temperature condition (fault condition), and/or a specified cell charge time out (fault condition). At the end of cell equalization, the string of individual battery cells connected in series generally is considered at a 100% state of charge even though each individual battery cell may not be fully charged.

In addition to over charging, battery cells may experience damage if the cell temperature falls outside a specific range. Thus, cell temperatures are advantageously kept within a specified temperature range during bulk charging and cell equalization to prevent temperature damage from occurring.

Another concern for battery cells is over-discharge. Over-discharge often causes serious performance degradation and damage the cell. Over-discharge may occur when any cell voltage drops below a fixed voltage level. To prevent overdischarge, secondary batteries often are equipped with a mechanism that terminates discharge when any cell drops below a fixed voltage level. Sometimes, however, the cell voltage may rise after the discharge is terminated, so hysteresis may be necessary to prevent oscillations.

Thus, it is generally recognized that recharging a secondary battery having a series-connected string of cells preferably is accomplished in a manner that charges each cell to substantially the same level while avoiding overcharging any of the cells. Thus, there is a need for a cell equalizing charging system that is low-cost, uses simple circuitry, reduces power dissipation during charging, and operates efficiently.

SUMMARY OF THE INVENTION

A system for charging a secondary battery according to various aspects of the present invention comprises a plurality of battery cells connected in a series string, wherein the series string includes a first battery cell at a load end and an n th battery cell at a ground end, and a cell junction located between each respective pair of battery cells. The system, in one embodiment, also includes a plurality of charging sources, wherein a first charging source is electrically coupled to the load end, and a second charging source is electrically coupled to a first cell junction between the first battery cell and a second battery cell located adjacent to the first battery cell. In another embodiment, a charging source is electrically coupled to each cell junction formed every two cells thereafter. In one aspect of an exemplary embodiment of the invention, the system includes (n+2)/2 charging sources, while in another aspect of the invention, there are (n+1)/2 charging sources.

In one exemplary embodiment, the system includes a plurality of shunt regulators, wherein a respective shunt regulator is connected in parallel across each of the second battery cell to the nth battery cell. In one aspect of an exemplary embodiment of the invention, the system includes (n−1) shunt regulators connected in parallel across (n−1) battery cells.

In another exemplary embodiment, a charging source is electrically connected to each of the plurality of charging sources to provide charging current to each of the plurality of battery cells via the plurality of charging sources included in the system. In a further embodiment, the system includes a controller connected to each of the plurality of charging sources, wherein the controller includes circuitry to switch on and off each of the plurality of charging sources. In accordance with one aspect of an exemplary embodiment of the invention, the circuitry is configured to allow only one charging source to be switched on at a time.

In accordance with yet another exemplary embodiment, the system includes a shunt controller coupled to each of the plurality of shunt regulators to switch on and off each of the plurality of shunt regulators. In accordance with one aspect of an exemplary embodiment of the invention, the shunt controller is configured to switch on a shunt regulator if a battery cell with which the shunt regulator is connected across in parallel is fully charged, and switch off the shunt regulator if the battery cell is not fully charged. In still another exemplary embodiment, a controller is connected to each charging source and each shunt regulator, wherein the controller includes circuitry to switch on and off each of the plurality of charging sources, and switch on and off each of the plurality of shunt regulators.

Furthermore, in accordance with another embodiment, a plurality of cell monitoring circuits is included in the system, wherein at least one cell monitoring circuit is connected to each respective battery cell to monitor an amount of charge within each respective cell monitor, and in communication with the controller. In accordance with one aspect of the invention, the controller switches on only one charging source at a time, and determines if one or more of the plurality of battery cells needs to be charged. In accordance with another aspect of the invention, the controller determines a target battery cell, wherein the target cell is at least one of the plurality of battery cells needing to be charged, and is a battery cell located closer to the load end than any other of the plurality of battery cells that may need to be charged. In accordance with yet another aspect of the invention, the controller switches on a target charging source, wherein the target charging source is located at a cell junction between the target battery cell and the load end, and the target charging source is located at a cell junction farther away from the load end than another charging source located between the target battery cell and the load end. In accordance with still another aspect of the invention, the controller switches on and off each of the plurality of shunt regulators based upon an amount of charge within a battery cell associated with each respective shunt regulator.

Various exemplary embodiments of the present invention also include a method for equalizing voltage of a secondary battery being charged, the battery comprised of n cells connected in a serial string from a first cell at one end to an nth cell at another end with a respective cell junction being located between each adjacent cell, the method comprising the steps of connecting the plurality of switched charging sources to the serial string, wherein a first switched charging source is electrically coupled to the one end of the serial string, and a second switched charging source is electrically coupled at the cell junction between the first cell and an adjacent second cell, and a respective switched charging source is electrically coupled at the cell junctions occurring every two cells thereafter; connecting a plurality of shunt regulators to the serial string, wherein a respective shunt regulator is connected in parallel across each of the second cells through the nth cell; and operating the switched charging sources and the shunt regulators to selectively provide charging current to one or more of the n cells. In one aspect, the step of connecting a plurality of shunt regulators to the serial string includes the step of connecting (n−1) shunt regulators to the serial string. In another aspect, the step of connecting the plurality of switched charging sources to the serial string includes the step of connecting $((n+2)/2)$ switched charging sources to the serial string when n is an even number. In yet another aspect, the step of connecting the plurality of switched charging sources to the serial string includes the step of connecting $((n+1)/2)$ switched charging sources to the serial string when n is an odd number.

In one exemplary embodiment, the method further comprises the steps of operating each of the switched charging sources in one of a first state and a second state, wherein when a switched charging source is in the first state, the source provides a charging current to the respective cell junction where that switched charging source is electrically connected; and when the switched charging source is in the second state, the source does not provide a charging current to the respective cell junction where that switched charging source is electrically connected; and operating each of the shunt regulators in a first state to bypass charging current around the respective cell across which it is connected and operates as a high-impedance electrical path in a second state. In another exemplary embodiment, the method further comprises the step of operating the shunt regulators and the switched charging sources to provide charging current to each cell having a voltage below a predetermined threshold, and to avoid providing charging current to each cell having a voltage at or above a predetermined threshold. In yet another embodiment, the steps of monitoring a respective voltage level of each of the n cells; and determining which of the n cells is at or above a predetermined voltage threshold are included in the method.

The invention also includes a second exemplary method for equalizing voltage of a secondary battery. The second exemplary method includes the steps of monitoring an amount of charge contained within a plurality of battery cells utilizing at least one cell monitor to determine if at least one battery cell needs charging; transmitting a signal to begin charging operations from the at least one cell monitor when at least one of the plurality of battery cells needs charging; determining which charging source, of a plurality of charging sources, to utilize to charge said at least one of the plurality of battery cells needing charging; and switching on an appropriate charging source of the plurality of charging sources to charge said at least one of said plurality of battery cells needing charging, wherein the appropriate charging source is determined by its location with respect to at least one battery cell needing charge. In one exemplary embodiment, the method includes switching on at least one shunt regulator coupled in parallel to at least one of the plurality of battery cells, wherein the at least one shunt regulator is a shunt regulator coupled in parallel across a battery cell including a charge amount greater than a threshold amount. In one aspect of the invention, the second method includes the step of switching on at least one shunt regulator occurs prior to said step of switching on an appropriate charging source.

In another exemplary embodiment, the second method includes the cell monitor continuing to monitor the plurality of battery cells until at least one battery cell receiving charging current is charged to a threshold amount of charge as indicated by the cell voltage, and the controller switching on a shunt regulator coupled in parallel to the battery cell receiving charging current when the battery cell receiving charging current contains the threshold amount of charge as indicated by the cell voltage. These steps may be repeated until each battery cell contains the threshold amount of charge as indicated by the cell voltage. When each battery cell contains the threshold amount of charge as indicated by the cell voltage, the charging source and any shunt regulators that were switched on are switched off by the controller.

BRIEF DESCRIPTION OF THE DRAWINGS

A more complete understanding of the present invention may be derived by referring to the detailed description and claims when considered in connection with the drawing Figures, where like reference numbers refer to similar elements throughout the Figures, and:

FIG. 4 is a control truth table and operational chart for the topology illustrated in FIG. 3.

DETAILED DESCRIPTION OF THE INVENTION

The detailed description of various exemplary embodiments of the invention herein makes reference to the accompanying figures and drawings. While these exemplary embodiments are described in sufficient detail to enable those skilled in the art to practice the invention, it should be understood that other embodiments may be realized in that logical and mechanical changes may be made without departing from the spirit and scope of the invention. Thus, the detailed description herein is presented for purposes of illustration only and not by way of limitation. For example, the steps recited in any of the method or process descriptions may be executed in any order and are not limited to the order presented.

For the sake of brevity, the apparatus and systems (and components of the individual operating components) are described in detail herein. Furthermore, the connecting lines shown in the various figures contained herein are intended to represent exemplary functional relationships and/or physical couplings between the various elements. It should be noted that many alternative and/or additional functional relationships and/or physical connections may be present in a practical system.

Figure 1:
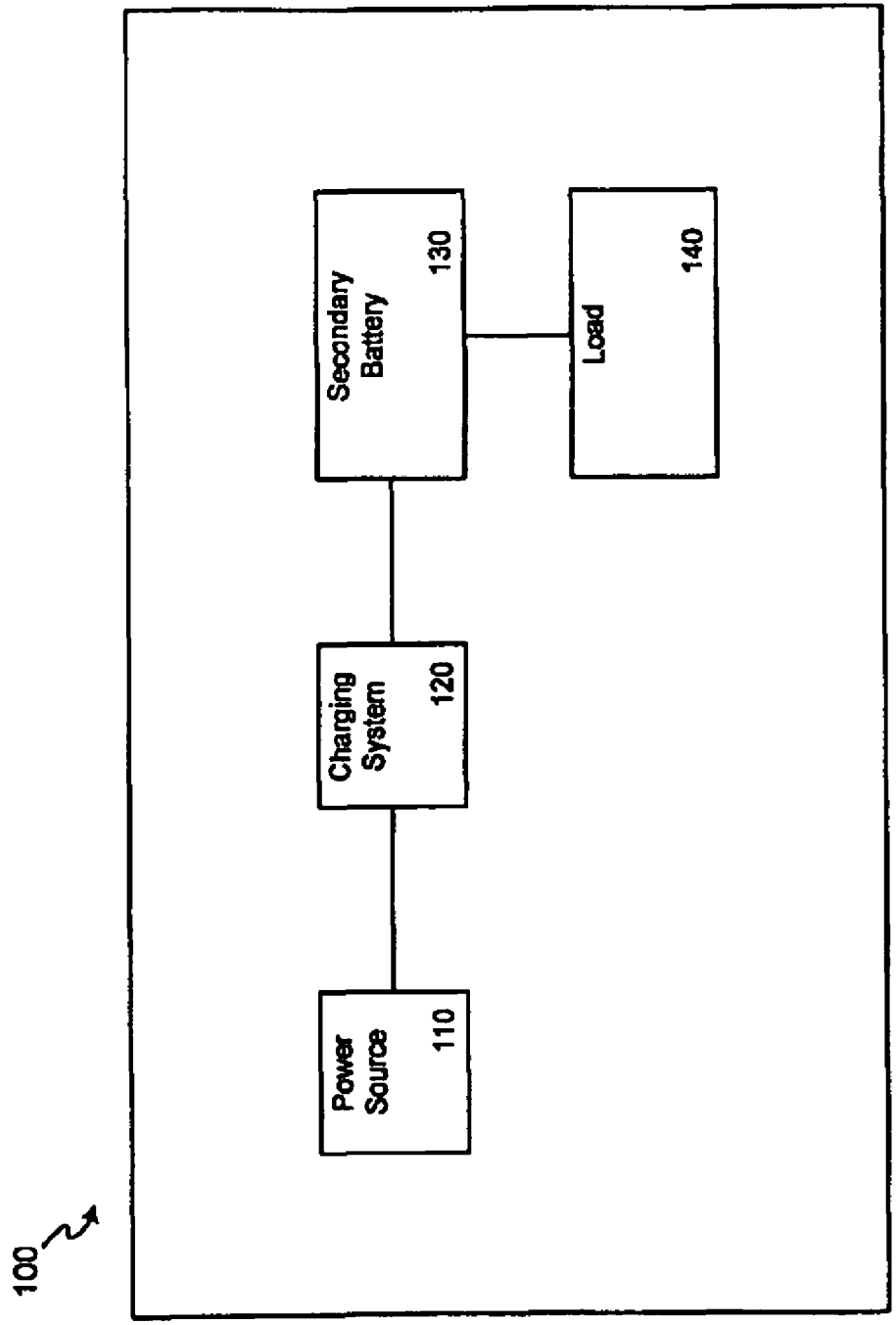
FIG. 1 is a block diagram of one exemplary embodiment of a device including a secondary battery, and a charging system to recharge the secondary battery.

Turning now to the figures, FIG. 1 is a block diagram of one exemplary embodiment of a device 100 including a secondary battery 130 and a charging system 120 to recharge secondary battery 130. Device 100, in one embodiment, includes power source 110. In an exemplary embodiment, power source 110 is a DC power source. In another exemplary embodiment, power source 110 is an AC power source. In one aspect of the invention (when power source 100 is a DC power source), power source 110 may be a solar panel such that power source 100 produces a DC signal. In another aspect of the invention (when power source 110 is an AC power source), power source 110 may be a standard AC outlet along with a transformer, or the like, to provide an appropriate voltage signal for charging secondary battery 130. The invention contemplates, however, that power source 110 may be any DC or AC power source known in the art capable of providing charging current to recharging secondary battery 130.

Device 100, in another exemplary embodiment, includes charging system 120 electrically connected to power source 110. In various aspects of the invention, charging system 120 may be suitably configured (as discussed in greater detail below) to charge one or more battery cells (not shown) within secondary battery 130.

In one exemplary embodiment, secondary battery 130 is a lithium-ion battery. In other embodiments of the invention, secondary battery 130 may be, but is not limited to, a lead-acid battery, a nickel-cadmium battery, a nickel-metal hydride battery, a nickel hydrogen battery, a silver-zinc battery, or any other battery capable of storing a charge and subsequently being recharged.

Device 100 includes load 140 which, in an exemplary embodiment, is a device that requires voltage and current. Examples of load 140 include, but certainly are not limited to, a personal digital assistant (PDA), a BlackBerry® device, a cellular phone, a pager, a Palm Pilot® device, and/or any other electronic or communication device capable of being supplied power by secondary battery 130.

Figure 2:
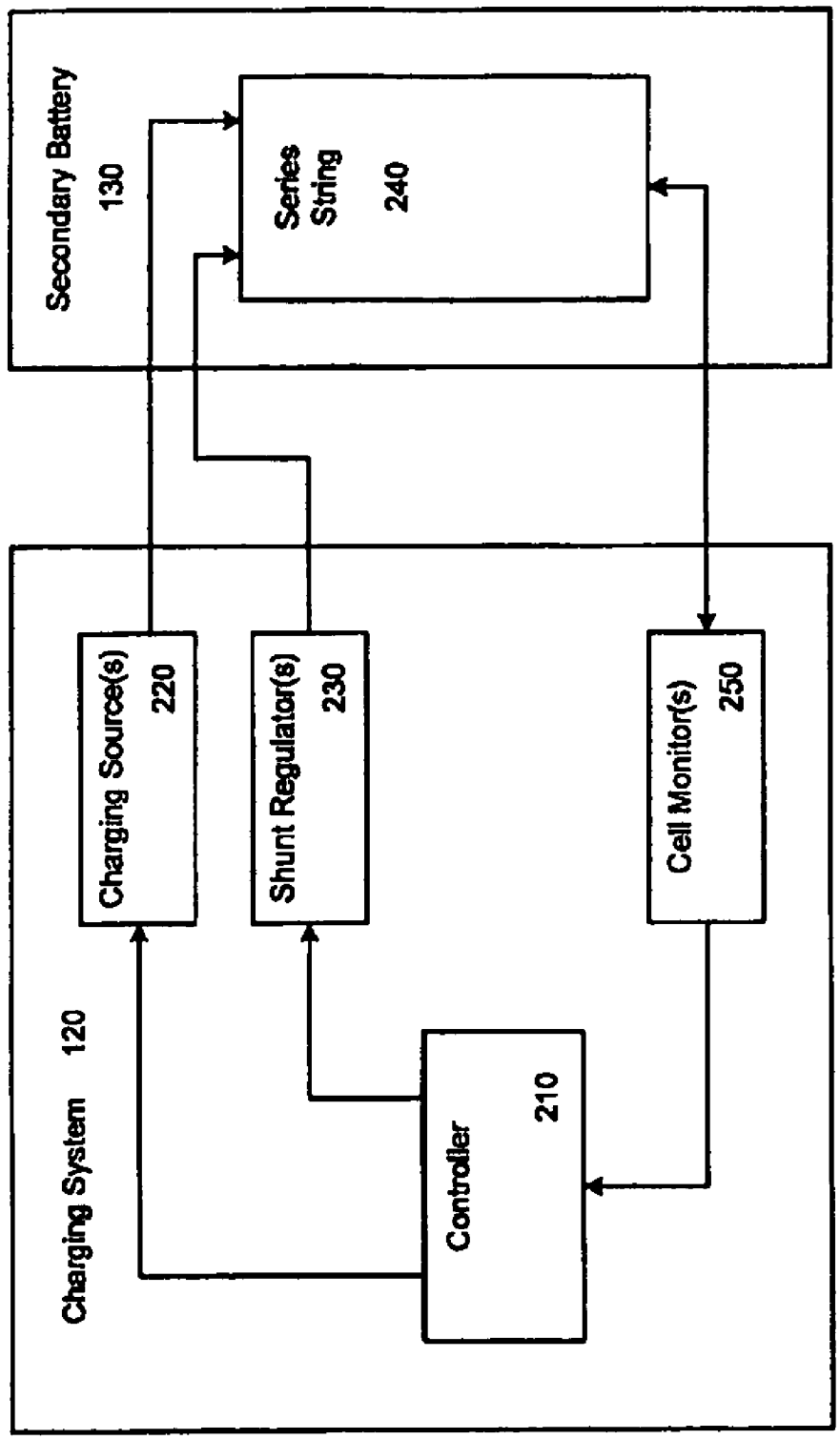
FIG. 2 is a block diagram of an exemplary embodiment of a charging system utilizing cell equalization to charge a secondary battery.

FIG. 2 is a block diagram of an exemplary embodiment of charging system 120 of FIG. 1. Charging system 120, in an exemplary embodiment, includes controller 210, which may be any hardware and/or software suitably configured to switch on and off charging sources 220 and/or shunt regulators 230. As such, controller 210 may be any controller known in the art capable of switching on and off charging sources and/or shunt regulators when appropriate to do such.

In one exemplary embodiment, controller 210 is connected to at least one charging source 220 and at least one shunt regulator 230. In other embodiments, charging system 120 includes a plurality of controllers (not shown) similar to controller 210, wherein a controller is connected to each charging source 220 to control the operation (i.e., on/off operation) of their respective charging source 220. In still other embodiments, charging system 120 includes a plurality of shunt regulator controllers (not shown) similar to controller 210, wherein a shunt regulator controller is connected to each shunt regulator 230 to control the operation (i.e., on/off operation) of their respective shunt regulator 230.

The invention contemplates that charging source 220 may be any hardware and/or software suitably configured to provide charging current to at least one battery cell if switched on (i.e., operating in a charging state), and not provide charging current to a battery cell if switched off (i.e., operating in a non-charging state). As such, charging source 220 may be any charging source known in the art capable of charging one or more battery cells. Likewise, shunt regulator 230 may be any hardware and/or software suitably configured to have a lower resistance than a battery cell connected in parallel if shunt regulator 230 is switched on, and a greater resistance than the battery cell if shunt regulator 230 is switched off. As such, shunt regulator 230 may be any shunt regulator known in the art capable of manipulating the flow of current into and/or away from a battery cell connected in parallel to shunt regulator 230.

In another exemplary embodiment, charging system 120 includes series string of battery cells 240 (hereinafter, "series string 240"). Series string 240, in an exemplary embodiment, contains one or more individual battery cells (not shown), wherein each battery cell voltage is dependent on the cell chemistry. As such, series string 240 may be configured to form a secondary battery of any desired voltage.

Charging system 120, in another exemplary embodiment, includes at least one cell monitor 250 connected to a respective battery cell and controller 210. Cell monitor 250 may be any hardware and/or software suitably configured to monitor the terminal voltage of one or more battery cells. As such, cell monitor 250 may be any cell monitor known in the art capable of detecting the terminal voltage of an individual or plurality of battery cells. In one aspect of the invention, cell monitor 250 may be configured to detect the terminal voltage of a battery cell (with a predetermined amount of error tolerance). In another aspect of the invention, cell monitor 250 may be configured to determine if a battery cell, with which cell monitor 250 is associated, contains a terminal voltage above or below a pre-determined threshold level. Furthermore, cell monitor 250, in an exemplary embodiment, is configured to communicate the terminal voltage of a battery cell and/or whether the battery cell contains above or below the threshold amount of charge to controller 210. As used herein, the term "above" with reference to a terminal voltage and/or a threshold amount of voltage means substantially the same as or greater than the amount. In addition, the invention contemplates that charging system 120 may be formed on a printed circuit board (PCB) (not shown) or on any other platform known in the art suitable for forming and/or operating charging system 120.

Figure 3:
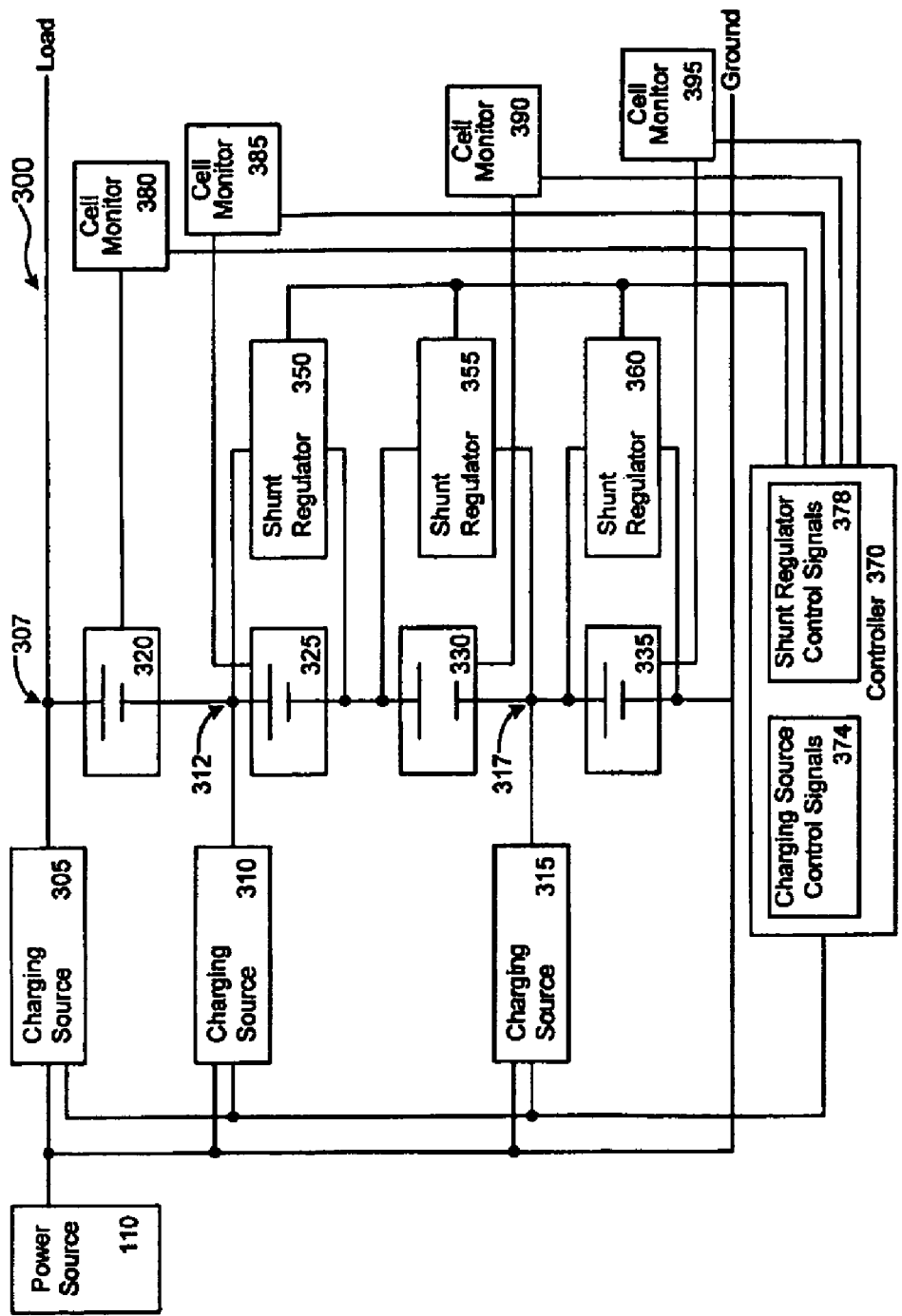
FIG. 3 is block diagram of one exemplary embodiment of a topology of the charging system of FIG. 2.

FIG. 3 is a block diagram of one exemplary embodiment of a topology 300 of charging system 120. In an exemplary embodiment, topology 300 includes a power source (e.g., power source 110) electrically connected to charging source 305, charging source 310, and charging source 315, wherein charging sources 305, 310, and 315 are each configured similar to charging source 220 discussed above. In one embodiment, charging source 305 is connected to and provides charging current to battery cell 320 through node 307. Likewise, charging source 310 is connected to and provides charging current to battery cells 325 and 330 through node 312. Furthermore, charging source 315 is connected to and provides charging current to battery cell 340 through node 317.

Battery cells 320, 325, 330, and 335, in an exemplary embodiment, are lithium-ion battery cells. In other embodiments, battery cells 320, 325, 330, and 335 may be, but are not limited to, lead-acid battery cells, nickel-cadmium battery cells, nickel-metal hydride battery cells, nickel hydrogen battery cells, silver-zinc battery cells, or any other type of battery cell capable of storing a charge and subsequently being recharged. In addition, the invention contemplates that battery cells 320, 325, 330, and 335 may each be any size battery cell known in the art.

Charging sources 305, 310, and 315, in one exemplary embodiment, are each connected to a controller 370 similar to controller 210 discussed above. In another exemplary embodiment, controller 370 is also connected to shunt regulators 350, 355, and 360, wherein shunt regulators 350, 355, and 360 are each configured similar to shunt regulator 230 discussed above. Controller 370, in one embodiment, is configured to transmit charging source control signals 374 to charging sources 305, 310, and 315 to control the on/off operation of charging sources 305, 310, and 315. Similarly, controller 370, in another embodiment, is configured to transmit shunt regulator control signals 378 to shunt regulators 350, 355, and 360 to control the on/off operation of shunt regulators 350, 355, and 360.

In an exemplary embodiment, shunt regulator 350 is coupled in parallel to battery cell 325 such that shunt regulator 350 is coupled to node 312 (i.e., the positive terminal (V+) of battery cell 325) and the negative terminal (V−) of battery cell 325. Furthermore, shunt regulator 355 is connected in parallel to battery cell 330 such that shunt regulator 355 is connected to V+ of battery cell 330, and to node 317 (i.e., V− of battery cell of 330). Moreover, shunt regulator 360 is connected in parallel to battery cell 335 such that shunt regulator 360 is connected to V+ and V− of battery cell 335.

Topology 300, in another exemplary embodiment, includes cell monitor 380, cell monitor 385, cell monitor 390, and cell monitor 395, each being configured similar to cell monitor 250 discussed above. In one embodiment, cell monitors 380, 385, 390, and 395 are connected to battery cells 320, 325, 330, and 335, respectively, and are each connected to controller 370. In an exemplary embodiment, cell monitors 380, 385, 390, 395 are each suitably connected to cells 320, 325, 330, and 335 such that cell monitors 380, 385, 390, and 395 are each capable of reading the amount of charge contained within cells 320, 325, 330 and 335, respectively. In another exemplary embodiment, cell monitors 380, 385, 390, and 395 are suitably connected to controller 370 such that cell monitors 380, 385, 390, and 395 are capable of communicating the amount of charge (or whether their respective battery cell includes charge above or below the threshold amount) contained within battery cells 320, 325, 330, and 325 to controller 370.

FIG. 4 is a control truth table and operational chart for topology 300, as illustrated in FIG. 3. For the illustrated embodiment of FIG. 3, there are 16 different permutations of the state of charge for battery cells 320, 325, 330, and 335 during a charging operation. Only a few permutations will be described in detail herein, as doing so will make the other states of the control truth table readily apparent. Column 1 reflects the 16 different possible permutations of FIG. 3. Columns 2, 3, 4, and 5 indicate the state of charge (i.e., fully charged (high) or not fully charged (low)) of battery cells 320, 325, 330, and 335, respectively. Columns 6, 7, and 8 indicate the state of operation (i.e., on or off) of charging sources 305, 310, and 315, respectively. Columns 9, 10, and 11 illustrate the state of operation (i.e., on or off) of shunt regulators 350, 355, and 360, respectively. Column 12 illustrates the state of operation of topology 300 (i.e., charging system 120), as illustrated in FIG. 3.

For example, in permutation 5, battery cells 320, 330, and 335 are not fully charged and need to be charged, whereas battery cell 325 is fully charged and should not be further charged (i.e., over-charged). In this situation, charging source 305 will be switched on by controller 370 since charging source 305 is the charging source electrically closest to battery cell 320. In other words, the charging source which is: (i) located between a battery cell needing charge that is located closest to the load, and the load, and (ii) located farther away from the load than any other charging source(s) that may be located between the battery cell needing charge that is located closest to the load, and the load. Furthermore, shunt regulator 350 will also be switched on. As such, current will flow from charging source 305 and charge cell 320. Also, current will flow through shunt regulator 350 by-passing battery cell 325 since shunt regulator 350 is switched on. Moreover, current will flow through and charge battery cells 330 and 335. Thus, battery cells 320, 330, and 335 will receive the necessary charging current, but battery cell 325 will not receive charging current. Therefore, shunt regulator 350 allows charging current to effectively by-pass a fully charged battery cell 325 such that battery cell 325 will not become over-charged, and possibly damaged.

Permutation 10 is another example of how topology 300 provides charging current to battery cells needing to be charged, but yet does not provide charging current to cells fully charged. In this example, battery cells 325 and 330 need to be charged, whereas battery cells 320 and 335 are fully charged, or are at least contain an amount of charge above a threshold amount. As such, charging source 310 is switched on by controller 370 for the same reasons as charging source 305 in the above example. In addition, controller 370 will switch on shunt regulator 360 to prevent battery cell 335 from receiving charging current. Hence, charging current is supplied by charging source 310 to battery cells 325 and 330, and the charging current flows through shunt regulator 360 to ground to avoid overcharging battery cell 335.

Permutation 15 illustrates the example of when only battery cell 335 requires recharging. In this example, controller 370 switches on charging source 315 (for the above reasons) such that charging current will flow from charging source 315 through battery cell 335 to ground. As such, battery cells 320, 325, and 330 do not receive charging current since they are charged above the minimum threshold amount.

The remaining permutations (i.e., permutations 1-4, 6-9, 11-14, and 16) may analyzed in a manner similar to permutations 5, 10, and 15. Furthermore, the invention contemplates that only one of charging sources 305, 310, and 315 will be on at any time. As such, the invention minimizes the amount of charging current that is dissipated during a charging operation.

Figure 5:
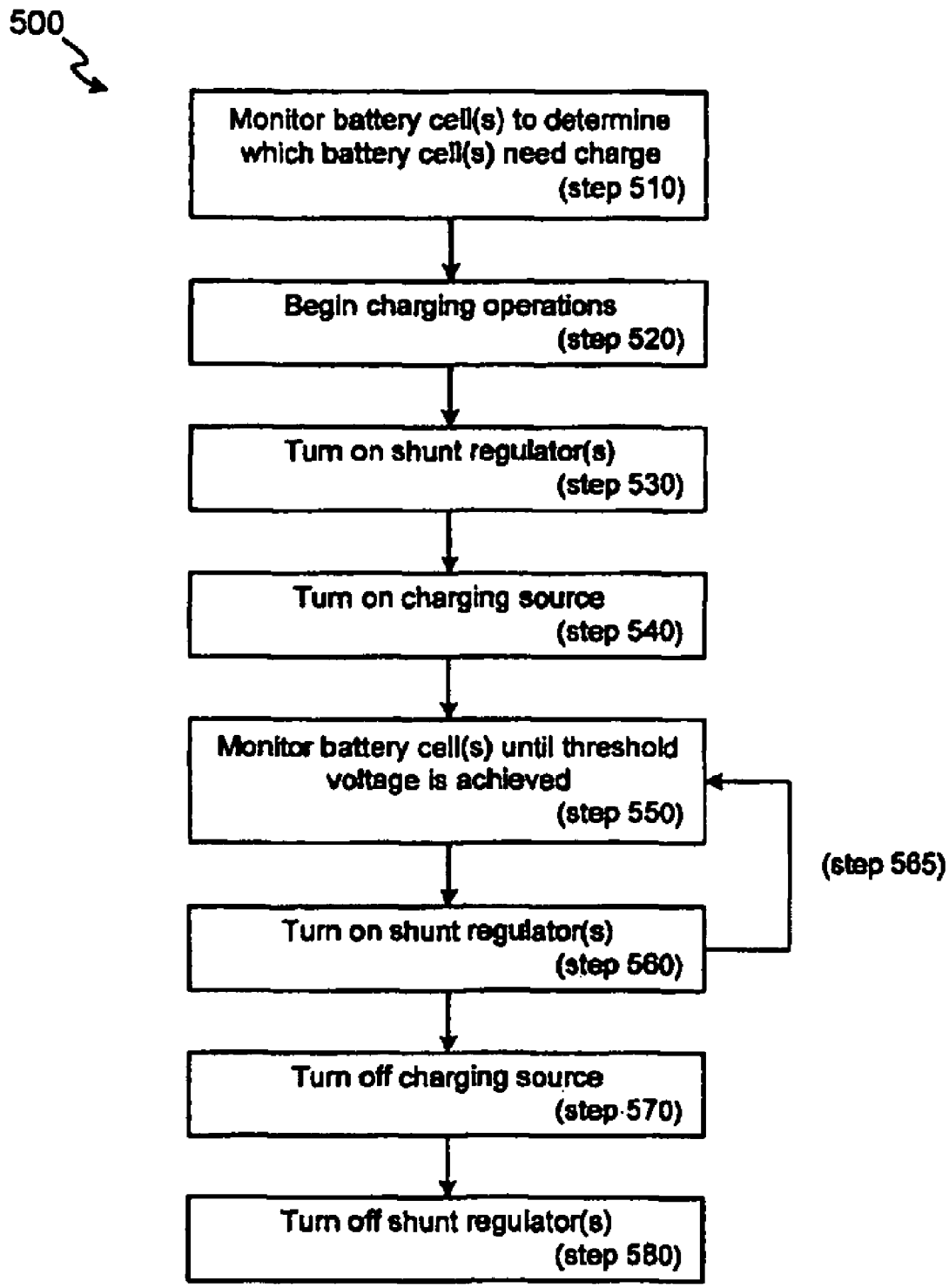
FIG. 5 is a flow diagram illustrating an exemplary embodiment of a method for charging a secondary battery utilizing cell equalization.

FIG. 5 is a flow diagram illustrating an exemplary embodiment of a method 500 for charging a secondary battery utilizing cell equalization. In one exemplary embodiment, method 500 initiates by at least one cell monitor (e.g., cell monitor 250) beginning to monitor the amount of charge in at least one battery cell (e.g., battery cell 320) to determine if battery cell 320 needs to be charged (step 510). When cell monitor 250 determines that battery cell 320 needs to be charged, cell monitor 250, in one embodiment, transmits a signal to a controller (e.g., controller 270) to begin charging operations (step 520). In another embodiment, controller 270, if needed, then switches on at least one shunt regulator (e.g., shunt regulator 230) to divert charging current from charging any battery cells 320 that are fully charged or charged above a threshold amount (step 530).

Once any needed shunt regulators 230 are switched on such that charging current will be diverted around any battery cells 320 not needing to be charged (i.e., to prevent over-charging), in one exemplary embodiment, controller 270 will switch on the appropriate charging source (step 540). Which controller 270 switches on is determined in the manner discussed above in the examples discussing permutations 5, 10, and 15 of FIG. 4. While charging operations are being performed, in one embodiment, cell batteries 320 are monitored by the cell monitor(s) 250 until the threshold voltage is reached in at least one battery cell 320 (step 550).

In one embodiment, once the cell monitor(s) 250 transmits a signal to controller 270 indicating that at least one battery cell 320 has been charged to the threshold charge amount, controller 270 switches on the shunt regulator 230 connected in parallel to that particular cell battery 320 to divert the charging current from further charging the battery cell 320 (step 560). In another exemplary embodiment, steps 550 and 560 may be repeated until each battery cell 320 of series string 240 is charged to or above the threshold amount (step 565). After each battery cell 320 is charged to or above the threshold amount, controller 270 switches off charging source 305 (step 570) and any shunt regulators 230 that are switched on (step 580).

Benefits, advantages and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of the invention. All structural, and functional equivalents to the elements of the above-described exemplary embodiments that are known to those of ordinary skill in the art are expressly incorporated herein by reference. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

What is claimed is:

1. A system for charging a secondary battery comprising a plurality of battery cells connected in a series string, said series string comprising a first battery cell connected to a load and an $N^{th}$ battery cell connected to a ground, and a cell junction formed at a connection between each respective pair of adjacent battery cells, said system comprising:
    a plurality of charging sources comprising exactly $(N+2)/2$ charging sources when N is an even number or $(N+1)/2$ charging sources when N is an odd number, each of the plurality of charging sources having a first state and a second state, wherein in the first state, the charging source provides a charging current and in the second state, the charging source does not provide a charging current, said plurality of charging sources further comprising:
        a first charging source electrically coupled to said load end;
        a second charging source electrically coupled to a first cell junction between said first battery cell and a second battery cell located adjacent to said first battery cell; and
        an additional charging source electrically coupled to each cell junction occurring every two cells thereafter; and
    a plurality of shunt regulators, wherein a respective shunt regulator is connected in parallel across each battery cell connected between the first battery cell and the $N^{th}$ battery cell and in parallel across the $N^{th}$ battery cell, wherein each of said plurality of shunt regulators is configured to operate in a first state and a second state, wherein in the first state, a shunt regulator clamps a voltage of a battery cell with which said shunt regulator is connected in parallel across to a predetermined voltage and bypassing current around the respective cell with which the shunt regulator is connected in parallel, and in the second state, the shunt regulator does not clamp the voltage of the battery cell, and wherein said plurality of shunt regulators comprises exactly $N-1$ shunt regulators; and
    a controller connected to each of the plurality of charging sources and each of the plurality of shunt regulators, said controller comprising circuitry to selectively operate each of the plurality of charging sources in the first state or the second state, and each of the plurality of shunt regulators in the first state or the second state to provide charging current to each battery cell having a voltage less than the predetermined voltage and to avoid providing charging current to each battery cell having a voltage equal to or greater than the predetermined voltage, wherein the controller is configured to allow only one charging source to be switched on at a time.

2. The system of claim 1,
    wherein the controller is connected to each of the plurality of shunt regulators, wherein the controller is configured to cycle each of said plurality of shunt regulators between said first state and said second state.

3. The system of claim 2, wherein said controller is configured to cycle each of said plurality of shunt regulators to said first state if a battery cell with which said shunt regulator is coupled across in parallel has a voltage equal to a predetermined voltage, and cycle each of said plurality of shunt regulators to said second state if said battery cell has a voltage less than the predetermined voltage.

4. A method for equalizing voltage of a secondary battery being charged, the battery comprised of N cells connected in a serial string from a first cell at a load end to an $N^{th}$ cell at a ground end with a respective cell junction formed at the connection between each pair of adjacent cells, the method comprising:

coupling a plurality of switched charging sources to the serial string, wherein said plurality of switched charging sources coupled to the serial string comprises $(N+2)/2$ switched charging sources coupled to the serial string when N is an even number, wherein a first switched charging source is electrically coupled to the load end of the serial string, and second switched charging source is electrically coupled at the cell junction between the first cell and a second cell adjacent said first cell; and a respective switched charging source is electrically coupled at the cell junctions occurring every two cells thereafter, wherein each of the switched charging sources selectively operates in one of a first state and a second state, wherein when a switched charging source is in the first state, the switched charging source provides a charging current to the respective cell junction or load end to which that switched charging source is electrically coupled; and when the switched charging source is in the second state, the source does not provide a charging current to the respective cell junction or load end to which that switched charging source is electrically coupled;

coupling a plurality of shunt regulators to the serial string, wherein said plurality of shunt regulators coupled to the serial string comprises exactly N−1 shunt regulators, wherein a respective shunt regulator is connected in parallel across each of the second cell through the $N^{th}$ cell, wherein each of said plurality of shunt regulators is configured to operate in a first state and a second state, wherein each of the shunt regulators selectively operates in a first state and a second state and when in a first state a shunt regulator clamps a voltage of the respective cell with which it is connected in parallel to a predetermined voltage by diverting a charging current received at the respective cell junction to a cell junction at another terminal of said respective cell, and when in a second state, the shunt regulator operates as a high-impedance electrical path; and selectively operating the switched charging sources and the shunt regulators in the respective first state or in the respective second state to provide charging current to each of the cells having a voltage less than the predetermined voltage and to avoid providing charging current to each cell having a voltage equal to or greater than the predetermined voltage, wherein only one charging source operates in the first state at any given time.

5. The method of claim 4, wherein said plurality of switched charging sources coupled to the serial string comprises $(N+1)/2$ switched charging sources coupled to the serial string when N is an odd number.

6. The method of claim 4, further comprising:
monitoring a respective voltage level of each of the N cells; and
determining which of the N cells is at or above a predetermined voltage threshold.

7. A method for equalizing voltage of a secondary battery comprising a plurality of series connected battery cells, said method comprising:
a) monitoring an amount of charge contained within each of the plurality of battery cells utilizing at least one cell monitor to determine if at least one battery cell of the plurality of battery cells needs charging, said monitoring comprising monitoring a voltage of each of the plurality of cells and determining that at least one battery cell of the plurality of battery cells needs charging if the monitored voltage is less than a predetermined threshold voltage, wherein said plurality of battery cells comprises N series connected battery cells;
b) transmitting a signal to begin charging operations from said at least one cell monitor, to a controller, when at least one of said plurality of battery cells needs charging;
c) determining, by said controller, which charging source, of a plurality of charging sources, to utilize to charge said at least one of said plurality of battery cells needing charging, wherein said plurality of charging sources comprises switched charging sources coupled to the plurality of series connected battery cells comprises $(N+1)/2$ switched charging sources coupled to the serial string when N is an odd number;
d) switching on, by said controller, an appropriate charging source of said plurality of charging sources to charge said at least one of said plurality of battery cells needing charging, wherein said appropriate charging source is determined by its connection within the plurality of series connected battery cells with respect to the at least one battery cell needing charging, wherein only one charging source is switched on at any given time;
e) switching on at least one shunt regulator of a plurality of shunt regulators, each shunt regulator of the plurality of shunt regulators coupled in parallel with at least one of said plurality of battery cells, wherein said plurality of shunt regulators comprises exactly N−1 shunt regulators, and wherein said at least one shunt regulator is a shunt regulator coupled in parallel across a battery cell having a voltage greater than or equal to the predetermined threshold voltage, wherein said switching on comprises operating the at least one shunt regulator in a first state, wherein the shunt regulator, when operating in the first state, clamps the voltage of the respective battery cell with which it is connected in parallel to the predetermined voltage by diverting a charging current received at the battery cell around said respective battery cell, and when in a second state, the shunt regulator operates as a high-impedance electrical path.

8. The method of claim 7, wherein said step of switching on at least one shunt regulator occurs prior to said step of switching on an appropriate charging source.

9. The method of claim 7, further comprising the steps of:
g) continuing to monitor, by said cell monitor, said plurality of battery cells until at least one battery cell receiving charging current is charged to a threshold amount of charge, wherein said threshold amount of charge is determined by monitoring the voltage of the battery cell and determining that the battery cell is charged to the threshold amount of charge when the monitored voltage of said battery cell is equal to or greater than the predetermined voltage; and h) cycling to said first state, by said controller, a shunt regulator coupled in parallel to said battery cell receiving charging current when said battery cell receiving charging current contains said threshold amount of charge.

10. The method of claim 9, further comprising:
i) repeating steps g) and h) until each of said plurality of battery cells contains said threshold amount of charge.

11. The method of claim 10, further comprising the steps of:
i) switching off, by said controller, said charging source when each of said plurality of battery cells contains said threshold amount of charge; and
j) cycling any shunt regulator to said second state, by said controller, any shunt regulator cycled to said first state by said controller.

12. A system for charging a rechargeable battery, said rechargeable battery comprising at least three battery cells connected in a series string, wherein a first battery cell of the at least three battery cells is connected to a load, a third battery cell of the at least three battery cells is connected to a ground, and a second battery cell of the at least three battery cells is connected between the first and third battery cells, and wherein a cell junction is formed between each pair of battery cells, said charging system comprising:
a controller transmitting charging source control signals and shunt regulator control signals;
a plurality of charging sources coupled to said series string receiving charging source control signals from the controller, each charging source of said plurality of charging sources responsive to charging source control signals from the controller for selectively operating in a first or a second state, wherein in the first state, the charging source provides a charging current and in the second state, the charging source does not provide a charging current, said plurality of charging sources comprising:
a first charging source of the plurality of charging sources comprising an input terminal connected to a power source and an output terminal coupled to the load for providing, via the output terminal, a charging current for the first battery cell, a charging current for the second battery cell, and a charging current for the third battery cell when operating in the first state and no charging current when operating in the second state; and
a second charging source of the plurality of charging sources comprising an input connected to the power source and an output terminal connected to the cell junction between the first battery cell and the second battery cell, for providing, to said cell junction, the charging current for the second battery cell and the charging current for the third battery cell when operating in the first state and no charging current when operating in the second state; and a plurality of shunt regulators coupled to said series string receiving and responsive to shunt regulator control signals from the controller for selectively operating in a first or a second state, said plurality of shunt regulators comprising:
a first shunt regulator of the plurality of shunt regulators comprising an input terminal connected to the cell junction between the first battery cell and the second battery cell and an output terminal connected to the cell junction between the second battery cell and the third battery cell for clamping a voltage of the second battery cell to a predetermined voltage and diverting current around the respective cell with which the shunt regulator is connected in parallel when operating in the first state and not clamping the voltage of the second battery cell when operating in the second state; and
a second shunt regulator of the plurality of shunt regulators comprising an input terminal connected to the cell junction between the second battery cell and the third battery cell and an output terminal connected to the ground for clamping a voltage of the third battery cell to the predetermined voltage and diverting current around the respective cell with which the shunt regulator is connected in parallel when operating in the first state and not clamping the voltage of the third battery cell when operating in the second state,
wherein the controller transmits charging source control signals to operate the first charging source of the plurality of charging sources in the first state until a voltage of one of the at least three battery cells exceeds the predetermined voltage, and then operates the plurality of charging sources and the plurality of shunt regulators to provide charging currents to the battery cells that have not exceeded the predetermined voltage and not to the battery cells that have exceeded the predetermined voltage, and wherein the controller transmits charging source control signals such that only one of the plurality of charging source operates in the first state at any given time.

13. The system of claim 12 further comprising voltage monitors for monitoring the voltage of each of the battery cells and providing the monitored voltage to the controller, wherein the controller operates only one charging source of the plurality of charging sources in the first state at any time and wherein the rechargeable battery comprises exactly N battery cells, the plurality of charging sources comprises exactly (N+2)/2 charging sources when N is an even number or (N+1)/2 charging sources when N is an odd number, and the plurality of shunt regulators comprises exactly N−1 shunt regulators.

* * * * *